United States Patent
Alexander

(10) Patent No.: US 9,532,089 B2
(45) Date of Patent: Dec. 27, 2016

(54) SESSION-BASED ENCRYPTION FOR DELIVERING CONTENT ON-DEMAND

(71) Applicant: CHARTER COMMUNICATIONS OPERATING, LLC, St. Louis, MO (US)

(72) Inventor: James Herbert Alexander, Denver, CO (US)

(73) Assignee: CHARTER COMMUNICATIONS OPERATING, LLC, St. Louis, MO (US)

( * ) Notice: Subject to any disclaimer, the term of this patent is extended or adjusted under 35 U.S.C. 154(b) by 8 days.

(21) Appl. No.: 14/575,252

(22) Filed: Dec. 18, 2014

(65) Prior Publication Data

US 2016/0182925 A1    Jun. 23, 2016

(51) Int. Cl.
| | |
|---|---|
| *H04L 29/00* | (2006.01) |
| *H04N 21/2343* | (2011.01) |
| *H04L 9/32* | (2006.01) |
| *H04N 21/2347* | (2011.01) |
| *H04N 21/266* | (2011.01) |
| *H04N 21/418* | (2011.01) |
| *H04N 21/437* | (2011.01) |
| *H04N 21/4405* | (2011.01) |
| *H04N 21/2383* | (2011.01) |

(52) U.S. Cl.
CPC ......... *H04N 21/23439* (2013.01); *H04L 9/32* (2013.01); *H04N 21/2347* (2013.01); *H04N 21/26606* (2013.01); *H04N 21/4181* (2013.01); *H04N 21/437* (2013.01); *H04N 21/4405* (2013.01); *H04L 2209/601* (2013.01); *H04N 21/2383* (2013.01)

(58) Field of Classification Search
CPC ...................................... H04L 9/00; H04J 1/16
USPC .......................................................... 380/211
See application file for complete search history.

(56) References Cited

U.S. PATENT DOCUMENTS

| | | | |
|---|---|---|---|
| 7,471,640 B2* | 12/2008 | Huang | H04L 27/3488 370/252 |
| 2005/0105732 A1* | 5/2005 | Hutchings | H04N 7/165 380/255 |

OTHER PUBLICATIONS

International Search Report and Written Opinion for International Application PCT/US15/66786; dated Mar. 29, 2016.

* cited by examiner

*Primary Examiner* — Brandon Hoffman
*Assistant Examiner* — Michael D Anderson
(74) *Attorney, Agent, or Firm* — Meagher Emanuel Laks Goldberg & Liao, LLP

(57) ABSTRACT

The specification and drawings present a new method, apparatus and software related product (e.g., a computer readable memory or storage device) for a session-based encryption (e.g., a common-tier encryption) for delivering a content (e.g., video, data, multi-media content and the like) on demand using multiple encryptors. According to an embodiment, the STB's request for a VOD session may be routed by a session resource manager (SRM) to receive content from an appropriate encryptor chosen from multiple encryptors based on a predefined criteria. This approach can minimize a number of encryptions/encryption devices (such as ECM generators) needed in a cable network. However, the simulcrypt encryptor can be also used, if necessary, e.g., when CAS-only encryptors are fully loaded with a traffic.

21 Claims, 4 Drawing Sheets

SESSION-BASED ENCRYPTION FOR DELIVERING CONTENT ON-DEMAND

FIELD OF THE INVENTION

The invention relates to multimedia communications and, more particularly but not exclusively, a session-based encryption for delivering a content (e.g., video) on demand.

BACKGROUND

A session-based common-tier encryption (SBCTE) delivery of video on demand (VOD) may rely on a mixture of regular session-based encryption (SBE) as well as common-tier encryption (CTE). When VOD content is delivered using CTE in an environment with multiple types of set-top boxes (STBs) each using a different conditional access system (CAS), a simulcrypt encryptor can be used to encrypt the video and insert multiple entitlement control messages (ECMs) into that video. These ECMs are for all the CAS types required to support the STBs that the video stream is delivered to. This may result in extra load on the ECM generators because the targeted STB will have a particular CAS and thus only use one of the multiple ECMs.

For example, a simulcrypt video encryption system, when deployed, will use a common-tier encryption to deliver VOD to customers. This means that all VOD sessions, will be carrying ECMs for multiple CASs, so that the ECM generators will be generating many ECMs that are never used.

SUMMARY

Various deficiencies in the prior art are addressed by using a method, apparatus and software related product according to embodiments disclosed herein.

One embodiment comprises a method including receiving, by a session resource computing device from a requesting device, a request for a content and a required type of conditional access system (CAS) for decrypting the content by the requesting device, the required type of CAS being out of a plurality of CAS types, each CAS type being associated with a group of requesting devices and distinguishable by a unique entitlement control message (ECM); and choosing, by the session resource computing device, an encryptor out of a plurality of encryptor options for the required type of CAS using a predefined procedure, the chosen encryptor being associated at least with the required type of CAS for encrypting the requested content using at least a corresponding ECM for the required type of CAS to deliver the encrypted requested content to the requesting device for decrypting the content using the corresponding ECM.

In various embodiments the requesting device may be a set top box (STB), the request may be a video on demand (VOD) request, and the content may be a video content or a movie.

One embodiment comprises an apparatus including a processor; a storage medium for tangibly storing thereon program logic for execution by the processor, the program logic comprising: logic to receive, by a session resource computing device from a requesting device, a request for a content and a required type of conditional access system (CAS) for decrypting the content by the requesting device, the required type of CAS being out of a plurality of CAS types, each CAS type being associated with a group of requesting devices and distinguishable by a unique entitlement control message (ECM); and logic to choose, by the session resource computing device, an encryptor out of a plurality of encryptor options for the required type of CAS using a predefined procedure, the chosen encryptor being associated at least with the required type CAS for encrypting the requested content using at least a corresponding ECM for the required type of CAS to deliver the encrypted requested content to the requesting device for decrypting the content using the corresponding ECM.

In various embodiments, the encryptor options may be implemented as an encryptor bank comprising: a group of N CAS only encryptors of types 1 through N, where N is a finite integer of two or more; a group of k simulcrypt encryptors, each simulcrypt encryptor being associated with multiple types of the CAS types selected from types 1 through N, where k is a finite integer of one or more; and a group of N ECM generators, each providing a corresponding input ECM to each of the group of CAS only encryptors of types 1 through N, and multiple ECMs of the corresponding multiple types of the CAS types selected from types 1 through N.

One embodiment comprises a non-transitory computer readable storage medium tangibly storing computer program instructions capable of being executed by a computer processor, the computer program instructions defining code for a method, comprising: receiving, by a session resource computing device from a requesting device, a request for a content and a required type of conditional access system (CAS) for decrypting the content by the requesting device, the required type of CAS being out of a plurality of CAS types, each CAS type being associated with a group of requesting devices and distinguishable by a unique entitlement control message (ECM); and choosing, by the session resource computing device, an encryptor out of a plurality of encryptor options for the required type of CAS using a predefined procedure, the chosen encryptor being associated at least with the required type of CAS for encrypting the requested content using at least a corresponding ECM for the required type of CAS to deliver the encrypted requested content to the requesting device for decrypting the content using the corresponding ECM.

One embodiment comprises a method including receiving by a video on demand (VOD) server from a session resource manager, a chosen encryptor for encrypting a requested content of the VOD request for delivering said video content to a set top box (STB), said chosen encryptor being associated a required type of conditional access system (CAS), for decrypting the video content by the STB, the required type of CAS being out of a plurality of CAS types, each CAS type being associated with a group of STBs and distinguishable by a unique entitlement control message (ECM), wherein said encryptor is chosen out of a plurality of encryptor options for the required type of CAS using a predefined procedure, the chosen encryptor being associated at least with the required type of CAS and adapted for encrypting the requested video content using at least a corresponding ECM for the required type of CAS to deliver the encrypted requested video content to the STB for decrypting the content using the corresponding ECM; and sending, by the VOD server, said requested video to the chosen encryptor for said encrypting.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
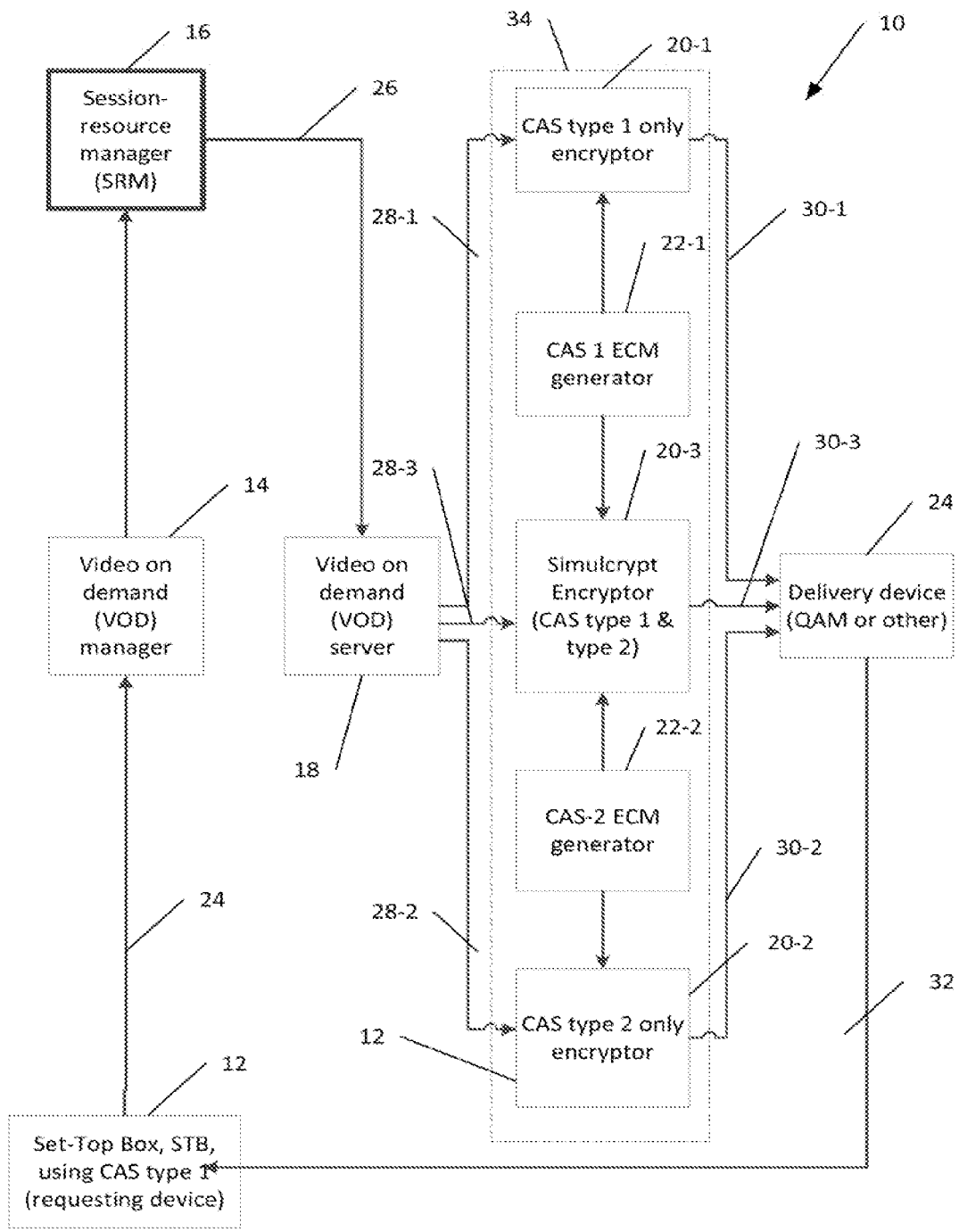
FIG. 1 is a high level block diagram of a system for a session-based encryption for delivering content on demand, according to an embodiment.

A method, apparatus and software related product (e.g., a computer readable memory or storage device) are presented for a session-based encryption (e.g., a common-tier encryption) for delivering content (e.g., video, data, multi-media content and the like) on demand using multiple encryptors. For example, when applying embodiments described herein, session-based common-tier encryption (SBCTE) delivery of video on demand (VOD) can reduce extra load on the entitlement control message (ECM) generators because a set-top box (STB) may only use one of multiple ECMs associated with corresponding conditional access systems (CASs) instead of using multiple ECMs all the time like in a conventional approach to accommodate multiple types of boxes such as STB. According to an embodiment, the STB's request for a VOD session may be routed by a session resource manager (SRM) to receive a content (such as video, movies, data, multi-media content, etc.) from an appropriate encryptor chosen from multiple encryptors based on a predefined criteria. This approach can minimize a number of ECM generators needed to feed the encryption devices in a cable network. However, the simulcrypt encryptor can be also used, if necessary, e.g., when CAS-only encryptors are fully loaded with a traffic (or fully used), as further described herein.

For the purposes of understanding various embodiments described herein, it is noted that a term "common-tier encryption" means that the same keys may be used across a tier and does not refer to a specific encryption method, such that the encryption methods may be any of an advanced encryption standard (AES), a data encryption standard (DES) and the like. Common-tier encryption is optional in carious embodiments described herein.

It should be further noted that a simulcrypt encryptor has associated with it a simulcrypt synchronizer (having a separate function according to standards), which puts the ECMs into the encrypted stream. Thus, the synchronizer and encryptor are typically present in one simulcrypt device. However, in order to maintain terminology uniform, the simulcrypt encryptor/synchronizer is called "encryptor" throughout.

According to one embodiment, a session resource computing device, e.g., comprising SRM typically located in a head end, may receive from a requesting device (e.g., STB), a request such as video on demand (VOD) for a content (such as a video, a movie, data and/or the like) and a required type of CAS, for decrypting (e.g., encrypting using the common-tier encryption) the requested content by the requesting device, the required type of CAS being out of a plurality of CAS types, each CAS type being associated with a group of requesting devices and distinguishable by a unique entitlement control message (ECM). Then the session resource computing device may choose/select, an encryptor out of a plurality of encryptor options for the required type of CAS using a predefined procedure, this chosen encryptor being associated at least with the required type of CAS, and being adapted for encrypting the requested content using at least a corresponding ECM for the required type of CAS to deliver the encrypted requested content to the requesting device for decrypting using the corresponding ECM.

After choosing the encryptor, the session resource computing device may provide to a request (VOD) server typically located also in the head end or a back office, this chosen encryptor for encrypting the requested content. Then the request (VOD) server can send the requested content (such as video) to the chosen encryptor for the encrypting. Alternatively, the session resource computing device in the SRM may perform this functionality as well, i.e., sending the requested content (such as the video content) to the chosen encryptor for the encrypting. After encryption the encrypted content can be provided to a delivery device which may be a quadrature amplitude modulation (QAM) device or the like for delivery of the modulated and encrypted content to the requesting device (e.g., STB) for decrypting the requested content.

According to a further embodiment, the plurality of CAS types may include type 1 and type 2, so that the plurality of encryptors can comprise three encryptor options including a CAS type 1 only encryptor, a CAS type 2 only encryptor, and a simulcrypt encryptor associated with both CAS type 1 and type 2. For example, if the required type of CAS having type 1, then the CAS type 1 only encryptor can be chosen if it is determined (e.g., by the SRM) that this type 1 only encryptor is not fully used and has enough capacity to encrypt the requested content. However, if it is determined that the CAS type 1 only encryptor is fully used, then the simulcrypt encryptor may be chosen Moreover, according to another embodiment, three or more CAS types can be used. For example, in case of three CAS types the plurality of encryptor options may comprise seven encryptor options including a CAS type 1 only encryptor, a CAS type 2 only encryptor, a CAS type 3 only encryptor, three simulcrypt encryptors associated with the CAS type 1 and type 2, with the CAS type 1 and type 3 and with the CAS type 2 and type 3, respectively, and one simulcrypt encryptor associated with the CAS type 1, type 2 and type 3. Seven encryptor options in this example is a maximum number of encryptor options. However, less than seven encryptor options (e.g., using selected simulcrypt encryptor options) can be used based on a particular application.

A general expression for a maximum number of encryptor options, $N_{max}$, can be written as follows:

$$N_{max} = \sum_{r=2}^{r=n} \frac{n!}{r!(n-r)!}, \quad (1)$$

where n is a plurality of CAS types, n being an integer of two or more and r is a number of CAS types used in a corresponding encryptor option. For example, it can be calculated using Equation 1 that for n=2, $N_{max}$=3, for n=3, $N_{max}$=7, for n=4, $N_{max}$=11, for n=5, $N_{max}$=26, etc.

According to a further embodiment, different encryptor options may be implemented with an encryptor bank located, e.g., in a hub, a head end, a data center, etc., which can comprise (see FIG. 2 for more detail): a group of N CAS only encryptors of types 1 through N, where N is a finite integer of two or more; a group of k simulcrypt encryptors, each simulcrypt encryptor being associated with multiple types of the CAS type only encryptors selected from types 1 through N, where k is a finite integer of one or more; and a group of N ECM generators, each providing a corresponding ECM to each of the group of CAS type only encryptors of types 1 through N, and multiple ECMs of the corresponding multiple CAS types only selected from types 1 through N to each of the corresponding simulcrypt encryptors.

Equation 1 is for a maximum number of encryptor options $N_{max}$. As was explained above, the real number of encryptor options may be chosen to be less than the $N_{max}$ based on a real need and/or a specific application.

FIGS. 1-5 further illustrate various embodiment described herein.

FIG. 1 shows an exemplary embodiment of a high level block diagram of a system 10 for a session-based encryption for delivering content (e.g., video, data, multi-media content, etc.) on demand using three encryptors 20-1, 20-2 and 20-3: CAS type 1 and type 2 only encryptors and one simulcrypt encryptor as explained herein. Encryptors 20-1, 20-2 and 20-3 comprise an encryptor bank 34.

In FIG. 1, an STB 12 associated, e.g., with CAS type 1 can request a VOD session to watch a movie/content. A message 24 is sent by the STB 12 to the VOD Manager 14 indicating the requested content (movie or video content) and the CAS type required for decrypting the content by the STB 12. The VOD Manager 14 (e.g., located in a back office), after confirming the purchase and availability of the content such as a movie, delivers the request (corresponding to the message 24) to the session-resource manager (SRM) 16 which may be located in the head end.

Then the SRM 16 can decide/choose an appropriate encryptor out of encryptors 20-1, 20-1 and 20-3 that should be used for encrypting the requested content. In order to make such decision the SRM 16 may check if the CAS type 1 encryptor (CAS type 1 being requested by the STB 12) is fully used or not. If there is available capacity on the CAS type 1 encryptor (i.e., it is not fully used), the SRM 16 will deliver instructions 26 to the VOD server 18 to deliver the VOD stream of the requested content to the CAS type 1 only encryptor 20-1 for encrypting the content. If, however, it is determined by the SRM 16 that there is no available capacity left for the CAS type 1 only encryptor 20-1 (i.e., it is fully used), the SRM 16 will deliver instructions 26 to the VOD server 18 to use the Simulcrypt encryptor 20-3 for encrypting the requested content.

Determining a load of a CAS type encryptor can be performed generally in terms of data (video) streams. Assume, for example, that each of encryptors 20-1, 20-2 and 20-3 can handle 10 streams at a time. Then if eleven CAS type 1 VODs with corresponding contents (e.g., movies) are requested by the corresponding twelve STBs like STB 12 at the same time, then only the first ten movies would be encrypted using the CAS type 1 only encryptor 20-1, but the last one requested movie would be encrypted using the simulcrypt encryptor 20-3. Then if additional thirteen CAS type 2 VODs with corresponding contents (e.g., movies) are requested by corresponding CASE type 2 thirteen STBs (not shown in FIG. 2) at the same time, then only the first ten movies would be encrypted using the CAS type 2 only encryptor 20-2, but the last three requested movies would be encrypted using the simulcrypt encryptor 20-3. Thus, the simulcrypt encryptor 20-3 would handle four video streams still having six streams empty.

Moreover, a more general model can be further used. For example, each of encryptors 20-1, 20-2 and 20-3 may have an overall bit rate capacity of x Gbits/sec. The video streams (movies) could have a variety of bit rates: y Gbits/sec, z Gbits/sec . . . , etc. Then the total number of Gbits/sec would determine how many actual video streams could be supported by the encryptor 20-1 and/or 20-2, before engaging the simulcrypt encryptor 20-3.

Referring back to FIG. 1, the VOD server 18 can stream the video content through the chosen encryptor (using links 28-1, 28-2 or 28-3 respectively). When the video content is streaming, corresponding one or more of ECM generators 22-1, 22-2 and 22-3 deliver corresponding generated ECM(s) to the chosen encryptor 20-1 (from the ECM generator 22-1), to the chosen encryptor 20-2 (from the ECM generator 22-2) or to the chosen encryptor 20-3 (from both the ECM generators 22-1 and 22-2).

The encrypted video content is then provided to a delivery device 24 for applying a corresponding method such as QAM modulation, internet protocol (IP) or the like for delivery the requested video through a link 32 to the STB 12 for decrypting.

It is further noted that locations of different device/modules/elements shown in FIG. 1 can vary. As cloud technologies come along, the locations can be more and more centralized. Also functionalities of devices may be also combined. For example, the SRM 16 may be implemented as a separate device/module or may be combined with any other devices/modules shown in FIG. 1, including VOD server 18 and/or VOD manager 14.

Figure 2:
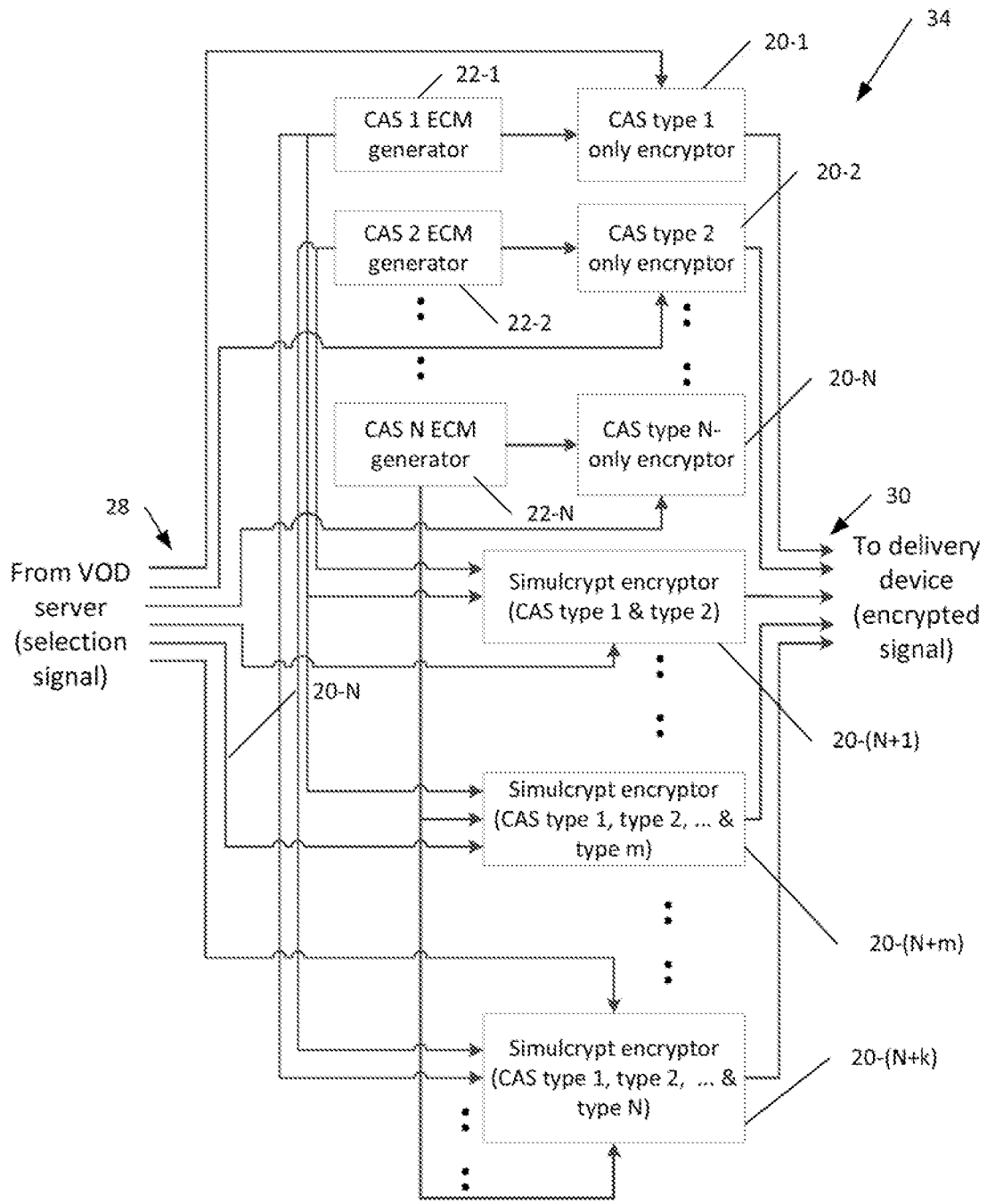
FIG. 2 is a block diagram of an encryptor bank comprising multiple encryptors, according to an embodiment.

FIG. 2 shows an exemplary embodiment of an encryptor bank 34 for a general case of having N CAS type only encryptors, where N is a finite integer of 2 or more. The encryptor bank 34 can be located in a hub, a head end, a data center, or the like. It can comprise a group of N CAS only encryptors 20-1, 20-2, . . . and 20-N of types 1 through N respectively, a group of k simulcrypt encryptors 20-(N+1), . . . 20-(N+m), . . . , 2-(n+k), where k is a finite integer of one or more, m is a finite integer of two or more and m<k. Each simulcrypt encryptor being associated with multiple CAS type only encryptors selected from types 1 through N; and a group of N ECM generators 22-1, 22-2, . . . 22-N, each providing a corresponding ECM input to each of the group of CAS only encryptors 20-1, 2012, . . . , 20-N of types 1 through N, and multiple ECMs of the corresponding multiple types of the CAS type only selected from types 1 through N to the corresponding simulcrypt encryptors 20-(N+1), . . . 20-(N+m), . . . , 2-(N+k).

Figure 3:
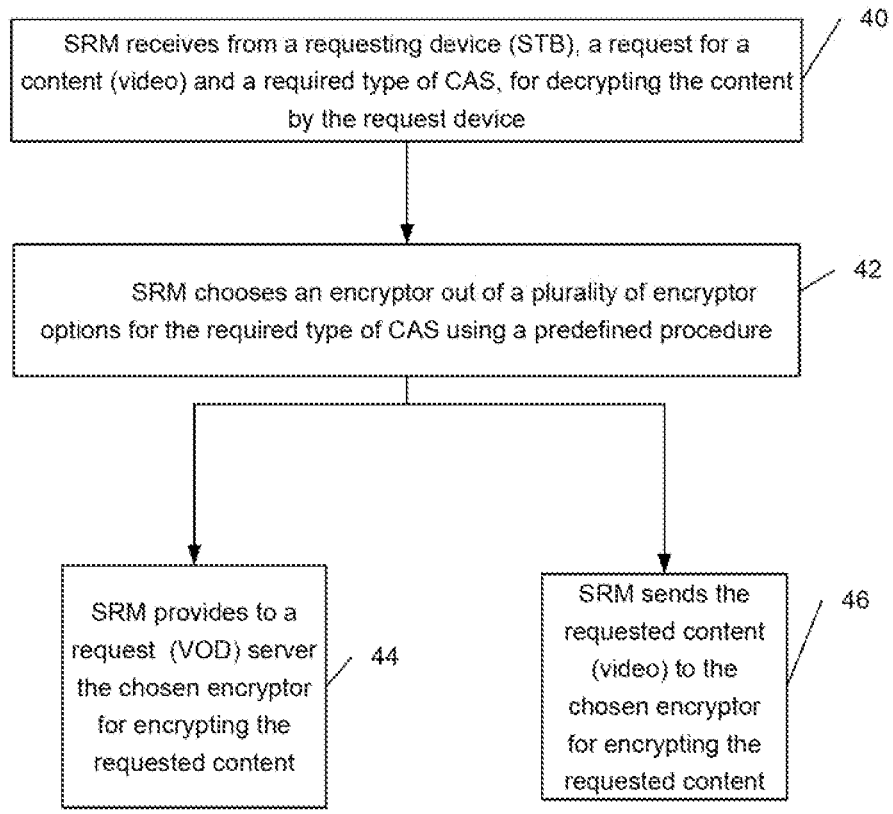
FIG. 3 is a flow chart demonstrating implementation by a SRM of an embodiment described herein.

With reference now to FIG. 3, shown is an exemplary flow chart demonstrating implementation of the various illustrated embodiments by a SRM, as described herein. It is noted that the order of steps shown in FIG. 3 is not required, so in principle, the various steps may be performed out of the illustrated order. Also certain steps may be skipped, different steps may be added or substituted, or selected steps or groups of steps may be performed in a separate application following the embodiments described herein.

In a method according to the embodiment shown in FIG. 3, in a first step 40, the SRM receives from a requesting device (STB), a request for a content (video, data, etc.) and a required type of CAS (for decrypting the content by the requesting device), the required type of CAS being out of a plurality of CAS types, each CAS type being associated with a group of requesting devices and distinguishable by a unique entitlement control message (ECM).

In a next step 42, the SRM chooses an encryptor out of a plurality of encryptor options for the required type of CAS using a predefined procedure, the chosen encryptor being associated at least with the required type of CAS for encrypting the requested content using at least a corresponding ECM for the required type of CAS to deliver the encrypted requested content to the requesting device for decrypting the encrypted content using the corresponding ECM. Then the SRM, depending on system architecture, can perform step 44 or 46.

In a step 44, the SRM can provide to a request (VOD) server the chosen encryptor for encrypting the requested content. In an alternative step 46, with functionalities of the SRM and the VOD server being combined, the SRM can send the requested content (video) to the chosen encryptor for encrypting the requested content.

Figure 4:
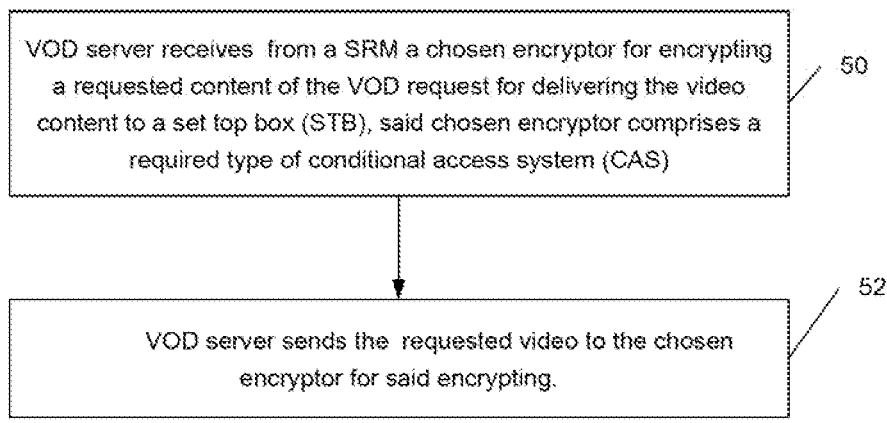
FIG. 4 is a flow chart demonstrating implementation by a server (VOD server) of an embodiment described herein.

With reference now to FIG. 4, shown is an exemplary flow chart demonstrating implementation of the various illustrated embodiments by a request server (VOD server), described herein. It is noted that the order of steps shown in FIG. 4 is not required, so in principle, the various steps may be performed out of the illustrated order. Also certain steps may be skipped, different steps may be added or substituted, or selected steps or groups of steps may be performed in a separate application following the embodiments described herein.

In a method according to the embodiment shown in FIG. 4, in a first step 50, the VOD server receives from the SRM a chosen encryptor for encrypting a requested content of the VOD request for delivering the video content to the requested STB. As described herein, the chosen encryptor is associated with a required type of the CAS for decrypting the video content by the STB, the required type of CAS being out of a plurality of CAS types, each CAS type being associated with a group of STBs and distinguishable by a unique entitlement control message (ECM), wherein said encryptor is chosen out of a plurality of encryptor options for the required type of CAS using a predefined procedure, the chosen encryptor being associated at least with the required type of CAS and adapted for encrypting the requested video content using at least a corresponding ECM for the required type of CAS to deliver the encrypted requested (video) content to the STB for decrypting the content using the corresponding ECM.

In a next step 52, the VOD server sends the requested video to the chosen encryptor for encrypting.

Figure 5:
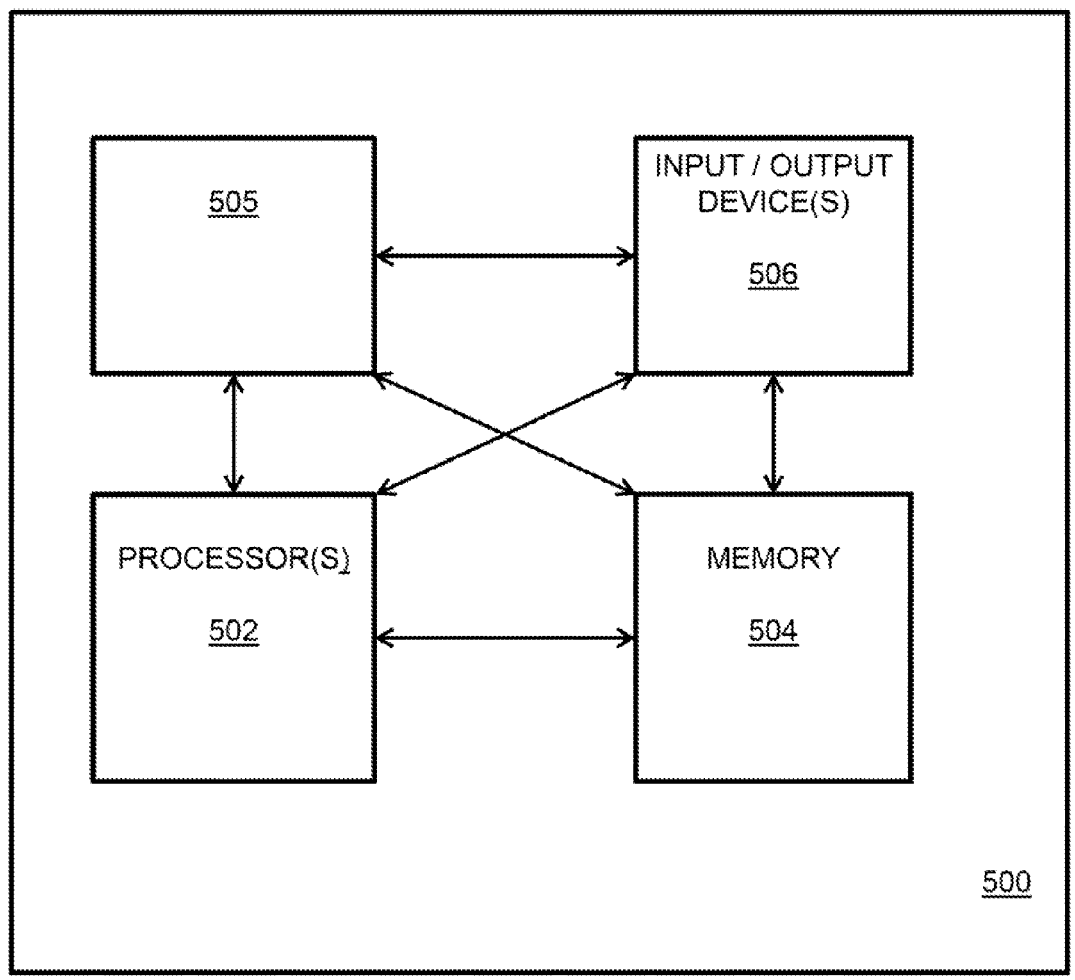
FIG. 5 shows a high-level block diagram of a computer suitable for performing various embodiments described herein.

FIG. 5 shows a high-level block diagram of a computer (e.g., session resource computing device) suitable for use in performing functions and various embodiments described herein.

As depicted in FIG. 5, computer 500 includes a processor element 503 (e.g., a central processing unit (CPU) and/or other suitable processor(s)), a memory 504 (e.g., random access memory (RAM), read only memory (ROM), and the like), a cooperating module/process 505, and various input/output devices 506 (e.g., a user input device (such as a keyboard, a keypad, a mouse, and the like), a user output device (such as a display, a speaker, and the like), an input port, an output port, a receiver, a transmitter, and storage devices (e.g., a tape drive, a floppy drive, a hard disk drive, a compact disk drive, and the like).

It will be appreciated that the functions depicted and described herein may be implemented in software and/or in a combination of software and hardware, e.g., using a general purpose computer, one or more application specific integrated circuits (ASIC), and/or any other hardware equivalents. In one embodiment, the cooperating process 505 can be loaded into memory 504 and executed by processor 503 to implement the functions as discussed herein. Thus, cooperating process 505 (including associated data structures) can be stored on a computer readable storage medium, e.g., RAM memory, magnetic or optical drive or diskette, and the like.

It will be appreciated that computer 500 depicted in FIG. 5 provides a general architecture and functionality suitable for implementing functional elements described herein or portions of the functional elements described herein.

Although various embodiments which incorporate the teachings of the present invention have been shown and described in detail herein, those skilled in the art can readily devise many other varied embodiments that still incorporate these teachings. Thus, while the foregoing is directed to various embodiments of the present invention, other and further embodiments of the invention may be devised without departing from the basic scope thereof. As such, the appropriate scope of the invention is to be determined according to the claims.

In describing alternate embodiments of the apparatus claimed, specific terminology is employed for the sake of clarity. The invention, however, is not intended to be limited to the specific terminology so selected. Thus, it is to be understood that each specific element includes all technical equivalents that operate in a similar manner to accomplish similar functions.

It is to be understood that the foregoing description is intended to illustrate and not to limit the scope of the invention, which is defined by the scope of the appended claims. Other embodiments are within the scope of the following claims.

It is noted that various non-limiting embodiments described herein may be used separately, combined or selectively combined for specific applications.

Further, some of the various features of the above non-limiting embodiments may be used to advantage without the corresponding use of other described features. The foregoing description should therefore be considered as merely illustrative of the principles, teachings and exemplary embodiments of this invention, and not in limitation thereof.

What is claimed is:

1. A method, comprising:
receiving, by a session resource computing device from a requesting device, a request for a content and a required type of conditional access system (CAS) for decrypting the content by the requesting device, the required type of CAS being out of a plurality of CAS types, each CAS type being associated with a group of requesting devices and distinguishable by a unique entitlement control message (ECM); and
choosing, by the session resource computing device, a single CAS type encryptor for the required type of CAS out of a bank of encryptors in the case of the single CAS type encryptor having available capacity;
choosing, by the session resource computing device, a multiple CAS type encryptor for the required type of CAS out of the bank of encryptors in the case of the single CAS type encryptor not having available capacity;
the chosen encryptor being associated at least with the required type of CAS for encrypting the requested content using at least a corresponding ECM for the required type of CAS to deliver the encrypted requested content to the requesting device for decrypting the content using the corresponding ECM.

2. The method of claim 1, wherein the requesting device is a set top box (STB), said request is a video on demand (VOD) request, and said content is a video content or a movie.

3. The method of claim 1, further comprising:
providing, by the session resource computing device to a request server or a video on demand (VOD) server, said chosen encryptor for encrypting the requested content.

4. The method of claim 1, further comprising:
sending, by the session resource computing device, said requested content to the chosen encryptor for said encrypting.

5. The method of claim 1, wherein said encrypting of said requested content being performed using a common-tier encryption.

6. The method of claim 5, wherein said common-tier encryption is used with one of a data encryption standard (DES) and an advanced encryption standard (AES).

7. The method of claim 1, wherein said encrypted content is modulated using quadrature amplitude modulation (QAM) before being delivered to the requesting device.

8. The method of claim 1, wherein said plurality of CAS types includes type 1 and type 2, so that said plurality of encryptor options comprises three encryptor options including a CAS type 1 only encryptor, a CAS type 2 only encryptor and a simulcrypt encryptor associated with said CAS type 1 and type 2.

9. The method of claim 8, wherein the required type of CAS is the type 1, so that the type 1 only encryptor is chosen if it is determined that said type 1 only encryptor is not fully used and has enough capacity to encrypt the content.

10. The method of claim 8, wherein the required type of CAS is the type 1, so that the simulcrypt encryptor is chosen if it is determined that said type 1 only encryptor is fully used.

11. The method of claim 1, wherein said plurality of CAS types includes type 1, type 2 and type 3, so that said plurality of encryptor options comprises seven encryptor options including a CAS type 1 only encryptor, a CAS type 2 only encryptor, a CAS type 3 only encryptor, three simulcrypt encryptors associated with the CAS type 1 and type 2, with the CAS type 1 and type 3 and with the CAS type 2 and type 3, respectively, and one simulcrypt encryptor associated with the CAS type 1, type 2 and type 3.

12. The method of claim 1, wherein said content is a video content, a movie, a data content or a multi-media content.

13. An apparatus comprising:
a processor;
a storage medium for tangibly storing thereon program logic for execution by the processor, the program logic comprising:
logic to receive, by a session resource computing device from a requesting device, a request for a content and a required type of conditional access system (CAS) for decrypting the content by the requesting device, the required type of CAS being out of a plurality of CAS types, each CAS type being associated with a group of requesting devices and distinguishable by a unique entitlement control message (ECM); and
logic to choose, by the session resource computing device, a single CAS type encryptor for the required type of CAS out of a bank of encryptors in the case of the single CAS type encryptor having available capacity;
logic to choose, by the session resource computing device, a multiple CAS type encryptor for the required type of CAS out of the bank of encryptors in the case of the single;
the chosen encryptor being associated at least with the required type CAS for encrypting the requested content using at least a corresponding ECM for the required type of CAS to deliver the encrypted requested content to the requesting device for decrypting the content using the corresponding ECM.

14. The apparatus of claim 13, wherein the requesting device is a set top box (STB), said request is a video on demand (VOD) request, and said content is a video content or a movie.

15. The apparatus of claim 13, wherein the encryptor bank comprising:
a group of N CAS only encryptors of types 1 through N, where N is a finite integer of two or more;
a group of k simulcrypt encryptors, each simulcrypt encryptor being associated with multiple types of the CAS types selected from types 1 through N, where k is a finite integer of one or more; and
a group of N ECM generators, each providing a corresponding input ECM to each of the group of CAS only encryptors of types 1 through N, and multiple ECMs of the corresponding multiple types of the CAS types selected from types 1 through N.

16. The apparatus of claim 15, comprising said encryptor bank.

17. A non-transitory computer readable storage medium tangibly storing computer program instructions capable of being executed by a computer processor, the computer program instructions defining code for: method, comprising:
receiving, by a session resource computing device from a requesting device, a request for a content and a required type of conditional access system (CAS) for decrypting the content by the requesting device, the required type of CAS being out of a plurality of CAS types, each CAS type being associated with a group of requesting devices and distinguishable by a unique entitlement control message (ECM); and
choosing, by the session resource computing device, a single CAS type encryptor for the required type of CAS out of a bank of encryptors in the case of the single CAS type encryptor having available capacity;
choosing, by the session resource computing device, a multiple CAS type encryptor for the required type of CAS out of the bank of encryptors in the case of the single CAS type encryptor not having available capacity;
the chosen encryptor being associated at least with the required type of CAS for encrypting the requested content using at least a corresponding ECM for the required type of CAS to deliver the encrypted requested content to the requesting device for decrypting the content using the corresponding ECM.

18. The non-transitory computer readable storage medium of claim 17, wherein the requesting device is a set top box (STB), said request is a video on demand (VOD) request, and said content is a video content or a movie.

19. A method, comprising:
receiving by a video on demand (VOD) server from a session resource manager, a chosen encryptor from a bank of encryptors for encrypting a requested content of the VOD request for delivering said video content to a set top box (STB), said chosen encryptor being associated with a required type of conditional access system (CAS), for decrypting the video content by the STB, the required type of CAS being out of a plurality of CAS types, each CAS type being associated with a group of STBs and distinguishable by a unique entitlement control message (ECM), wherein said encryptor is chosen out of said bank of encryptors comprises either a single CAS type encryptor for the required type of CAS if said encryptor bank includes a single CAS type encryptor having available capacity or a multiple CAS type encryptor for the required type of CAS if said encryptor bank does not include a single CAS type encryptor having available capacity, the chosen encryptor being adapted for encrypting the requested video content using at least a corresponding ECM for the required type of CAS to deliver the encrypted requested video content to the STB for decrypting the content using the corresponding ECM; and sending, by the VOD server, said requested video to the chosen encryptor for said encrypting.

20. The method of claim 19, wherein said encrypting of said video content being performed using a common-tier encryption.

21. The method of claim 1, wherein the encryptor bank comprises:
   a group of N CAS only encryptors of types 1 through N, where N is a finite integer of two or more;
   a group of k simulcrypt encryptors, each simulcrypt encryptor being associated with multiple types of the CAS types selected from types 1 through N, where k is a finite integer of one or more; and
   a group of N ECM generators, each providing a corresponding input ECM to each of the group of CAS only encryptors of types 1 through N, and multiple ECMs of the corresponding multiple types of the CAS types selected from types 1 through N.

* * * * *